United States Patent
Shimada

(10) Patent No.: US 7,203,760 B2
(45) Date of Patent: Apr. 10, 2007

(54) SYSTEM FOR DISTRIBUTING CONTENT DATA ACCORDING TO USER-SET CONTENT DISTRIBUTION SCHEDULES

(75) Inventor: Muneki Shimada, Tokyo (JP)

(73) Assignee: Sony Computer Entertainment Inc. (JP)

( * ) Notice: Subject to any disclaimer, the term of this patent is extended or adjusted under 35 U.S.C. 154(b) by 838 days.

(21) Appl. No.: 10/003,620

(22) Filed: Nov. 2, 2001

(65) Prior Publication Data
US 2002/0052957 A1    May 2, 2002

(30) Foreign Application Priority Data
Nov. 2, 2000   (JP) ............................. 2000-336551
Oct. 30, 2001  (JP) ............................. 2001-333463

(51) Int. Cl.
*G06F 13/00*    (2006.01)
(52) U.S. Cl. .................................... 709/235
(58) Field of Classification Search ............... 709/201, 709/217, 218, 219, 220, 222, 207, 232, 235; 717/168, 172, 173; 463/1, 40, 42; 705/14
See application file for complete search history.

(56) References Cited

U.S. PATENT DOCUMENTS

| | | |
|---|---|---|
| 5,848,162 A | 12/1998 | Tsumura |
| 5,978,855 A | 11/1999 | Metz et al. |
| 5,999,526 A | 12/1999 | Garland et al. |
| 6,047,127 A | 4/2000 | McCarten et al. |
| 6,182,111 B1 | 1/2001 | Inohara et al. |
| 6,338,044 B1 * | 1/2002 | Cook et al. .................... 705/14 |
| 6,912,586 B1 * | 6/2005 | Achtermann et al. ........ 709/232 |

FOREIGN PATENT DOCUMENTS

| | | |
|---|---|---|
| CN | 1160473 A | 9/1997 |
| EP | 0 762 686 A2 | 3/1997 |
| JP | 05-108584 A | 4/1993 |
| JP | 05-342119 A | 12/1993 |
| JP | 8036555 | 2/1996 |
| JP | 09-081455 A | 3/1997 |
| JP | 09-114782 A | 5/1997 |
| JP | 09-146887 A1 | 6/1997 |
| JP | 09-204346 A1 | 8/1997 |

(Continued)

OTHER PUBLICATIONS

Hafid, A., "A scalable video-on-demand system using future reservation of resources and multicast communications", Computer Communications, vol. 21, No. 5, May 1998, pp. 431-444.

(Continued)

*Primary Examiner*—Robert B. Harrell
(74) *Attorney, Agent, or Firm*—Lerner, David, Littenberg, Krumholz & Mentlik, LLP

(57) ABSTRACT

When content data is downloaded under a pull-type connection, a domestic client terminal device incorporates a schedule file supplied from a server machine, and the domestic client terminal device then accesses the server machine at the time specified by the schedule file, to thereby download the desired content data. When the content data is distributed under a push-type connection, the server machine accesses the individual domestic client terminal devices according to the schedule determined on the server machine side, and then distributes the desired content data.

12 Claims, 10 Drawing Sheets

FOREIGN PATENT DOCUMENTS

| | | |
|---|---|---|
| JP | 10-198610 A1 | 7/1998 |
| JP | 10-320337 A | 12/1998 |
| JP | 10-334061 A | 12/1998 |
| JP | 11069311 | 3/1999 |
| JP | 11-232233 A | 8/1999 |
| JP | 11-328050 A | 11/1999 |
| JP | 2000259532 | 9/2000 |
| WO | WO-96/08938 A1 | 3/1996 |
| WO | WO-96/08939 A1 | 3/1996 |
| WO | WO-00/40026 A1 | 7/2000 |

OTHER PUBLICATIONS

Subramanya, S.R., "Video Containers: A System for the On-Demand Storage, Delivery, and Management of Television Programs", 2000 IEEE International Conference in New York, NY, vol. 3, Jul. 30, 2000, pp. 1245-1249.

* cited by examiner

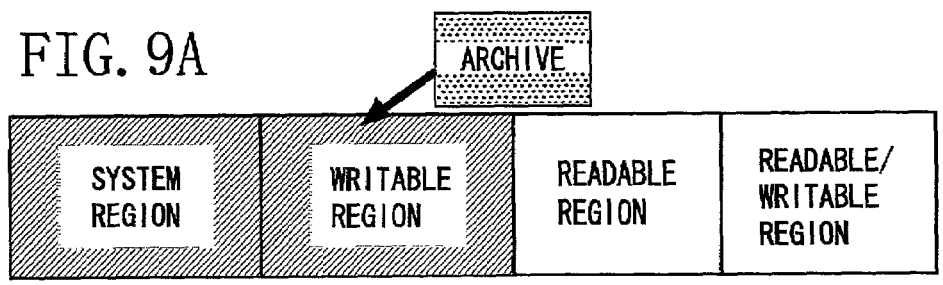
FIG. 9A
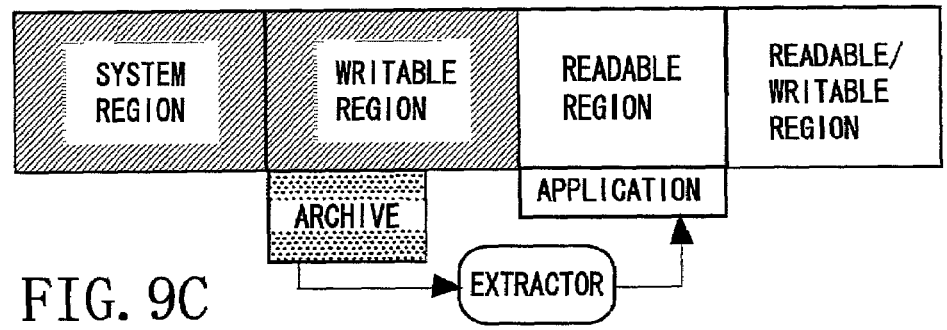
FIG. 9B
FIG. 9C
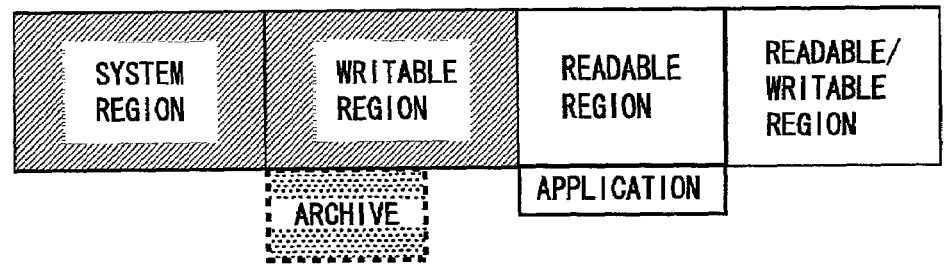
FIG. 9D
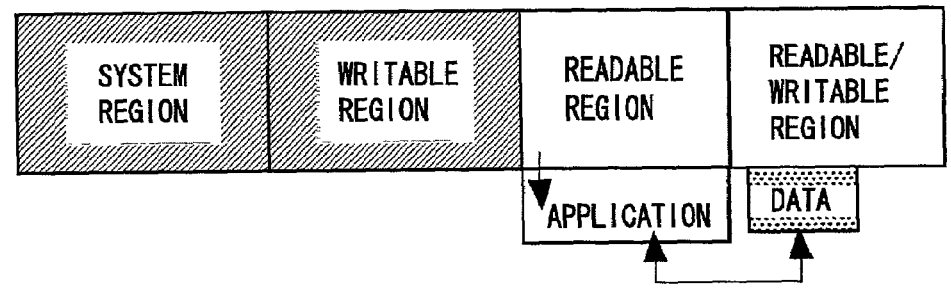
FIG. 9E
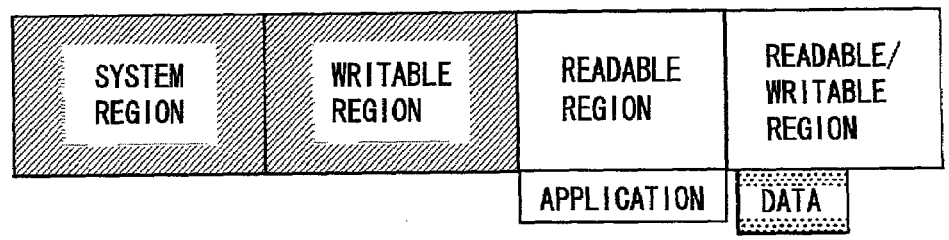

SYSTEM FOR DISTRIBUTING CONTENT DATA ACCORDING TO USER-SET CONTENT DISTRIBUTION SCHEDULES

CROSS-REFERENCE TO RELATED APPLICATIONS

The present application claims priority from Japanese Patent Application Nos. 2000-336551 filed on Nov. 2, 2000, and 2001-333463 filed on Oct. 30, 2001, the disclosures of which are hereby incorporated by reference herein.

BACKGROUND OF THE INVENTION

The present invention relates to an entertainment system and a server machine for distributing various content data for a video game, movie, news and music; a method for distributing such content data; a computer program for distributing content data; and a storage medium having recorded therein a computer program of a method for distributing content data.

Besides the conventional way of distributing music data, game programs or other content data stored on a storage medium such as CD-ROM, DVD-ROM and semiconductor memory, it is becoming popular to download content data from a network using a personal computer of the user.

More specifically, for a case of downloading desired content data, the user makes an access from the user's own personal computer using a web browser stored therein to a predetermined server computer or "server machine", and sends a request for distributing the desired content data. The server machine then distributes the content data requested by the user via a network to the personal computer of such user. On the side of the personal computer, the content data distributed from the server machine is stored in a storage medium such as hard disk (HD). The user can thus obtain the desired content data without using a storage medium such as CD-ROM or DVD-ROM.

It is, however, often seen on the day of launching distribution of content data for a very popular game or for music content data of a popular musician that a huge number of distribution requests are received at a server machine from the users wanting to obtain the content data. Since the transmission band available for the content data distribution is limited, the conventional content data distribution system has suffered from saturation of the network transmission band (network congestion) when the distribution requests are concentrated. This interferes with smooth content data distribution in the content distribution system.

SUMMARY OF THE INVENTION

The present invention was proposed to solve the foregoing problems, and an object thereof resides in providing an entertainment system, a server machine, a method for distributing content data, and a storage medium having recorded therein a computer program of a method for distributing content data, all of which are aimed at preventing network congestion and ensuring smooth content data distribution.

To solve the foregoing problems, the present invention introduced a concept of "scheduled content data distribution", which enables content data distribution according to a content data distribution schedule desired by the users, or alternatively which is set at the convenience of the server machine.

In the present invention, the content data distribution proceeds according to the content data distribution schedule, which is advantageous in preventing network congestion and ensuring smooth content data distribution.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIGS. 9A, 9B, 9C, 9D and 9E are drawings illustrating storage and decoding of archived content data downloaded into the domestic client terminal device in accordance with an embodiment of the invention;

DETAILED DESCRIPTION

Figure 1:
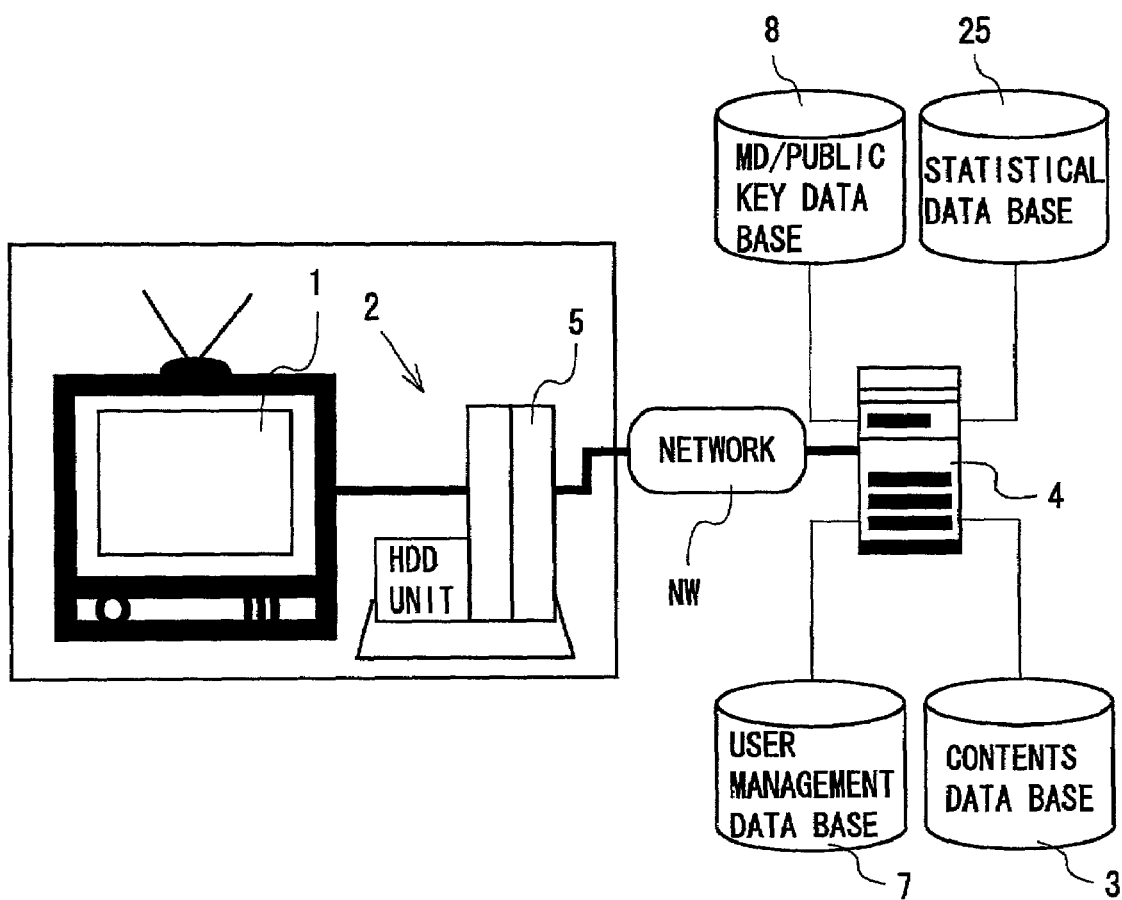
FIG. 1 is a block diagram of an entertainment system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Entire System Constitution

An entertainment system according to an embodiment of the present invention is composed of, as shown in FIG. 1, a domestic client terminal device 2 connected to a television image receiver 1 provided to each user's home, and a server machine 4 provided with a content data database 3 storing various content data such as video game, movie, news and music; both of which are connected with each other via a network NW such as can include a LAN (Local Area Network), the Internet via Internet Protocol through cable Internet services, xDSL (x Digital Subscriber Line), Ethernet and/or token ring, and/or a WAN (Wide Area Network).

Constitution of Domestic Client Terminal Device

The domestic client terminal device 2 comprises a main game unit 5 and a hard disk drive unit 6 (HDD unit).

Figure 2:
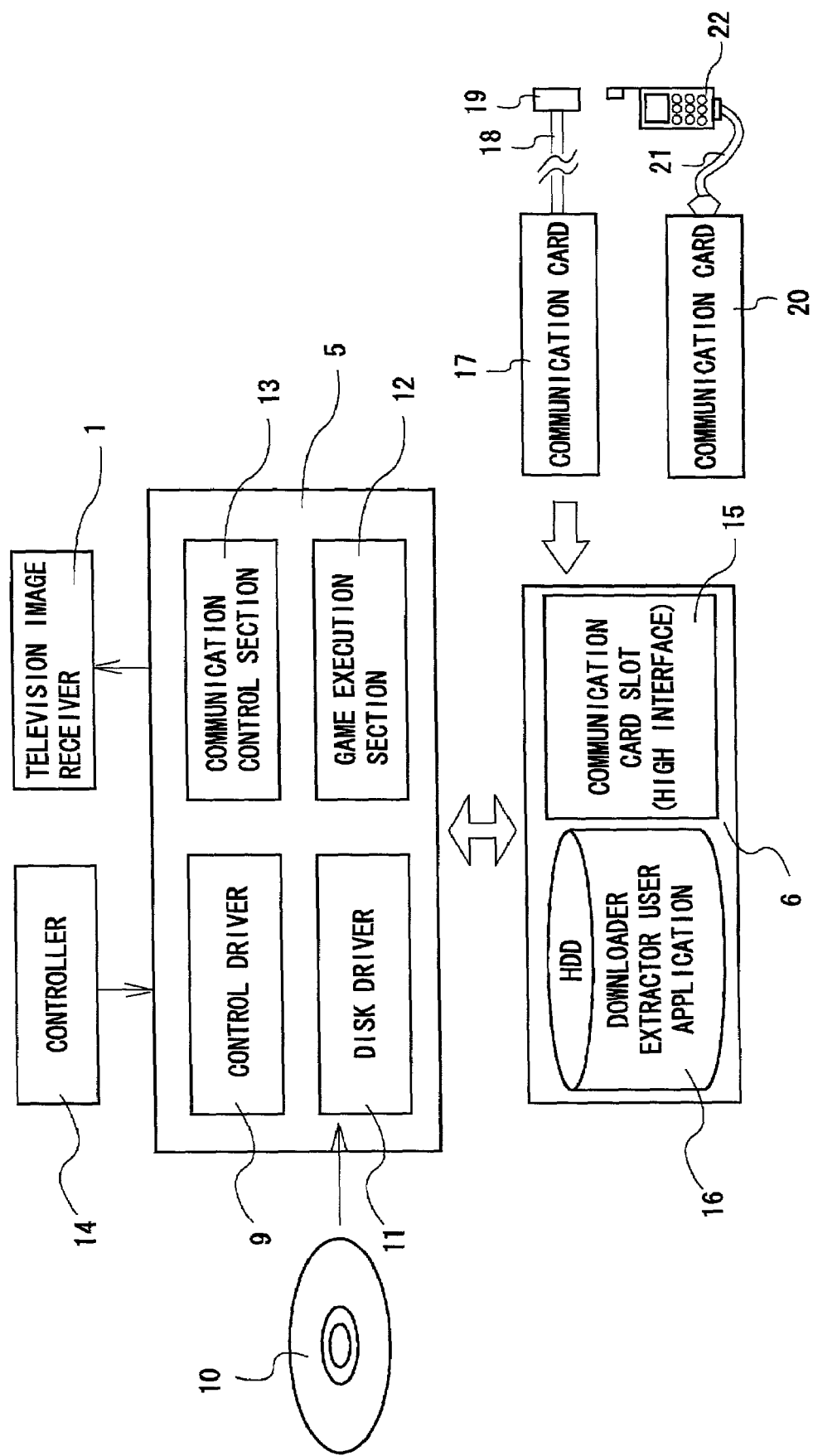
FIG. 2 is a block diagram of a domestic client terminal device included in the entertainment system.

FIG. 2 is a block diagram showing a specific constitution of such main game unit 5 and the HDD unit 6. As is clear from FIG. 2, the main game unit 5 comprises a disk driver or drive 11 for reproducing a program or data of a video game from a physical medium 10 such as a DVD-ROM or CD-ROM, a game execution section 12 for executing a video game based on the program or data of the video game reproduced by the disk driver or drive 11, a communication control section 13 for controlling communication of various content data such as video game, movie, news and music, details of which will be described later, and a control section 9 for controlling an entire portion of the domestic client terminal device 2.

The game execution section 12 is provided for forming a game image of a video game in response to operation of a controller by the user and outputting such image to the television image receiver 1 to display, by parallel rendering engine.

The game execution section 12 is designed to reproduce sound of DVD video, CD and the like besides video game sound in order to provide such sound to the television image receiver 1.

The communication control section 13 is provided for establishing a push-style or pull-style connection via the network NW to the server machine 4, to thereby control downloading of various content data into the HDD unit 6.

Constitution of HDD Unit

The HDD unit 6 mainly comprises a hard disk drive 16 (HDD) having a capacity of as large as 30 GB or 60 GB and a communication card slot 15.

The HDD 16 stores system programs such as "downloader" and "extractor", and a predetermined user application program. The "downloader" is a program for downloading various content data by communicating with the server machine 4 on the network NW. The "extractor" is also a program for decoding the various content data downloaded in an archived manner into a predetermined region of the HDD 16.

The communication card slot 15 is a high-speed interface allowing insertional connection of a communication card 17 for telephone line or a communication card 20 for mobile phone. The communication card 17 for telephone line can be connected to a telephone line provided for a user's home via a modular cable 18 and a modular jack 19, by which wire communication is established between the domestic client terminal device 2 and the server machine 4. On the other hand, the communication card 20 for mobile phone can be connected to a mobile phone 22 via a communication cable 21, by which wireless communication is established between the domestic client terminal device 2 and the server machine 4.

The entertainment system can support both wire communication and wireless communication, and operations and effects thereof are similar in both communication modes except that the content data is downloaded via wire or wirelessly. It should now be noted that the description below deals with the system based on wireless communication as a representative case.

Downloading of Content Data

The entertainment system is available only after the user makes a monthly payment contract with a system administrator, always keeps the power switch ON even when a game is not played, and set the user's own domestic client terminal device 2 so as to be connected to the server machine 4 using the communication card 17 for telephone line or the communication card 20 for mobile phone as shown in FIG. 2.

Such entertainment system allows downloading of various content data according to a schedule set by the user or set on the server side.

For the case that various content data are downloaded according to a schedule set on the server side, either downloading under so-called, pull-type connection or push-type connection is available, wherein the domestic client terminal device 2 accesses the server machine 4 in the former, and the server machine 4 accesses the domestic client terminal device 2 in the latter.

Downloading According to User-Set Schedule

Figure 3:
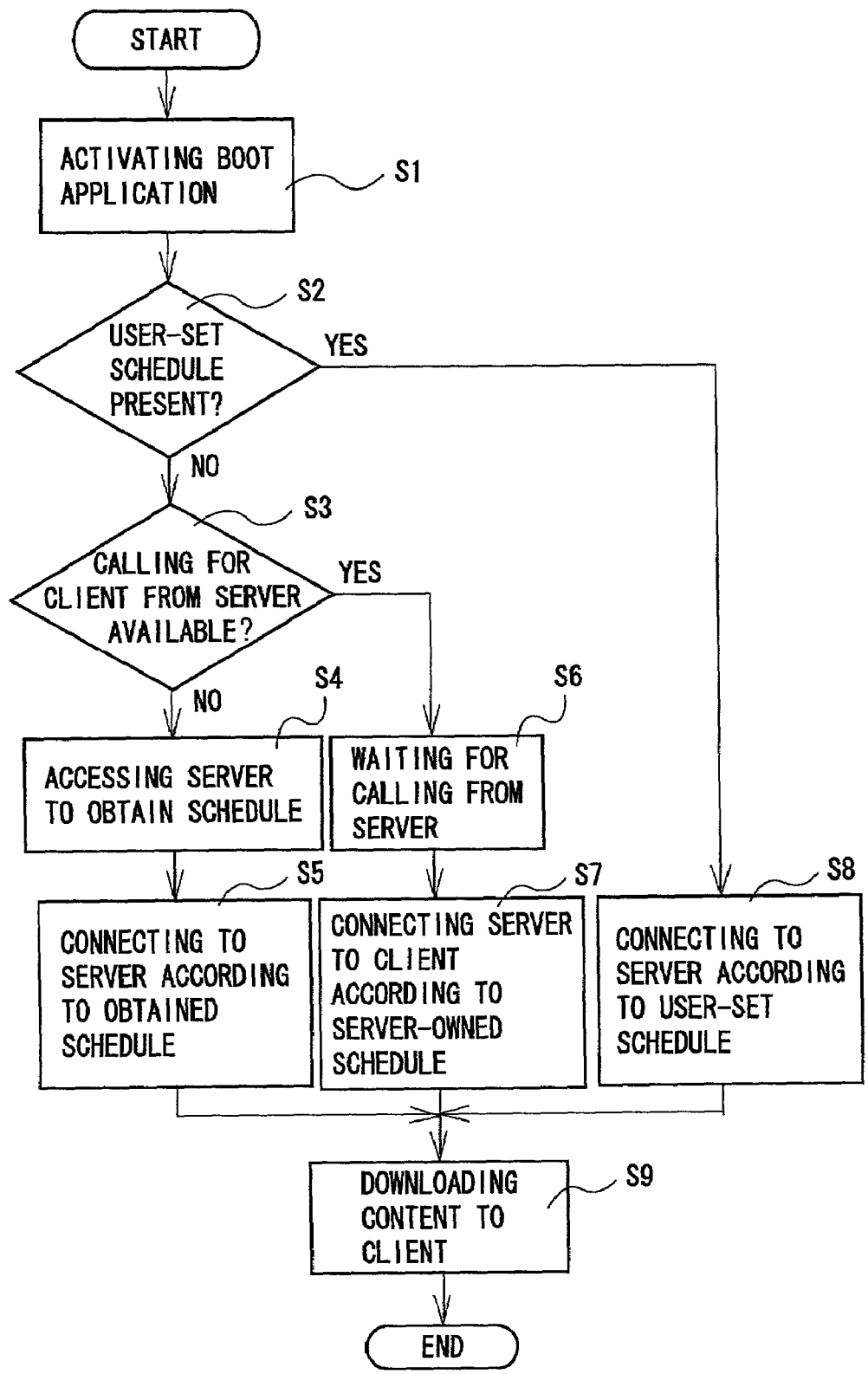
FIG. 3 is a flow chart illustrating a process of schedule-governed downloading in accordance with an embodiment of the invention.

A flow chart in FIG. 3 shows a process flow of downloading under the individual connection styles, in which a flow along step S1→step S2→step S8→step S9 indicates a process flow until the downloading is completed according to a user-set schedule.

The process flow shown in FIG. 3 starts when a main power source of the domestic client terminal device 2 is turned ON by the user, which is followed by a process in step S1. In step S1, the control section 9 shown in FIG. 2, a main power source of which is turned ON, activates a boot application program stored in the HDD 16 of the HDD unit 6, and also activates "downloader" and "extractor", which is followed by a process in step S2.

In step S2, the control section 9 determines whether a schedule set by the user is present or not, and the process goes to step S8 if the schedule is present (YES), and goes to step S3 if absent (NO).

More specifically, when the user joins the system, the user will receive from the system administrator side a magazine or an e-mail which contains guide of content data to be distributed, and schedule of their distribution period or time. Observing such schedule, the user selects desired content data and enters using the controller 14 a desired date and time of downloading of such content data. The control section 9 manages an identification of the content data and the specified date and time of downloading as "a user-set schedule".

When the date and time set by the user comes, the communication control section 13 makes, in step S8, the domestic client terminal device 2 access the server machine 4 based on the "downloader", and the process then goes to step S9. Thus in step S9, content data selected by the user will be downloaded according to a schedule set by such user at the time specified by such user.

The downloaded content data is supplied, under communication control by the communication control section 13, via the communication card 17 and the communication card slot 15 to the HDD 16, and is then stored under control of the control section 9 into a predetermined region (writable region in FIG. 7) of the HDD 16 described later.

Downloading under Pull-Type Connection

Next, a process flow of downloading under the pull-type connection style according to a schedule set by the server machine 4 will be described, in which the process flows as step S1→step S2→step S3→step S4→step S5→step S9.

When it is determined in step S2 that the user-set schedule is absent, the process goes to step S3. In step S3, it is necessary to obtain a schedule according to which the domestic client terminal device 2 operates, so that the communication control section 13 discriminates whether the domestic client terminal device 2 is set in a state accessible by the server machine 4 (that is, whether the domestic client terminal device 2 is set so as to accept "push" from the server machine 4), and the process goes to step S6 if YES, or goes to step S4 if NO.

The user can select whether to accept "push"-type distribution from the server machine 4 or not interactively, as guided by an interactive menu on the television image receiver 1 through operating the controller 14. The user is allowed to select either a "setting for accepting push delivery from the server machine 4" or a "setting for refusing push delivery from the server machine 4, and allowing only pull-type connection to such server machine 4 from the domestic client terminal device 2".

For the case that the domestic client terminal device 2 has the "setting for accepting push delivery from the server machine 4", the result in step S3 will be YES and the process goes to step S6. For the case that the domestic client terminal device 2 has the "setting for refusing push delivery from the server machine 4, and allowing only pull-type connection to such server machine 4 from the domestic client terminal device 2", the result in step S3 will be NO and the process goes to step S4.

In step S4, the communication control section 13 of the domestic client terminal device 2 accesses the server machine 4 using the "downloader" 16 since the domestic client terminal device 2 is set so as to refuse push-delivery of content data from the server machine 4. The domestic client terminal device 2 downloads a schedule file prepared on the server machine 4 into the HDD 16. The schedule file is not always common to all users but properly arranged for the individual clients depending on taste or desire of the users, details of which will be described later.

The communication control section 13 is so designed to access the server machine 4 in a periodic manner (e.g., via polling), so that a latest schedule file can be downloaded into the HDD 16 for every access.

Next in step S5, the communication control section 13 accesses the server machine 4 at the time scheduled on the server machine 4 according to the schedule file obtained in step S4, and the process goes to step S9. Thus, in step S9, content data selected by the user will be downloaded into the HDD 16 according to a schedule set on the server machine 4 at the time specified on the server machine 4.

Figure 4:
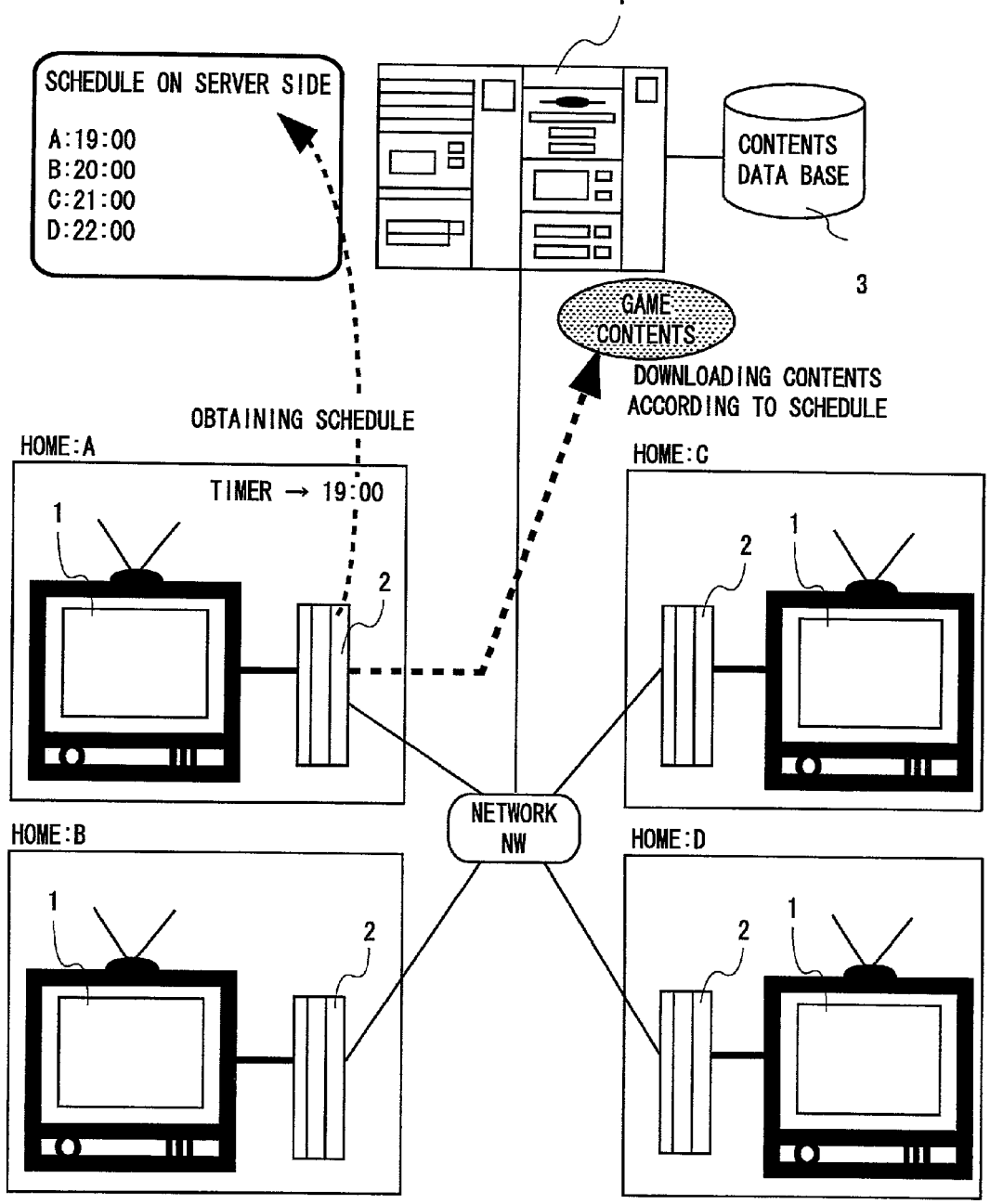
FIG. 4 is a schematic drawing illustrating a process of downloading content data to a domestic client terminal device via a pull-type of approach.

FIG. 4 is a schematic drawing showing the downloading of content data under such pull-type connection. In such drawing showing an exemplary case of downloading game content data from the server machine 4, the individual domestic client terminal devices 2 at the individual users' homes A to D periodically access the server machine 4 to thereby download schedules determined on such server machine 4.

In this exemplary case, allowable downloading time is assigned to each of the users' homes A to D, such as for example 19:00 for user's home A, 20:00 for user's home B, 21:00 for user's home C and 22:00 for user's home D.

Thus the domestic client terminal device 2 at user's home A accesses the server machine 4 at 19:00, by which a predetermined game content data is downloaded from such server machine 4 to the domestic client terminal device 2 at user's home A.

Similarly, the individual domestic client terminal devices 2 at users' homes B, C and D access the server machine 4 at 20:00, 21:00 and 22:00, respectively, by which predetermined game content data are downloaded from such server machine 4 to the individual domestic client terminals 2 at users' homes B, C and D, in a time differential manner.

The downloaded content data is supplied, under communication control by the communication control section 13, via the communication card 17 and the communication card slot 15 to the HDD 16, and then stored under control of the control section 9 into a predetermined region (writable region in FIG. 7) of the HDD 16 described later.

While the downloading time is adjusted for every user's home in the above exemplary case, it is also allowable that the downloading time is adjusted for every district among a plurality of districts served by the content distribution system.

A network has only a limited traffic and the downloading may be disabled due to delayed communication speed or over-capacity of the communication line if a huge number of users access the server machine 4 at the same time to request downloading of desired content data. On the contrary, the assignment of the downloading time for the individual users (or the individual districts) and the adjustment of the downloading in a time differential manner as described in the above can make an effective use of the limitative traffic of the network and can thus ensure smooth downloading of desired content data.

Downloading Under Push-type Connection

A process flow along step S1→step S2→step S3→step S6→step S7→step S9 in FIG. 3 indicates a process flow until the downloading under the push-type connection is completed according to a schedule set on the server machine 4.

When it is determined in step S2 that the user-set schedule is absent, and is then further determined in step S3 that the domestic client terminal device 2 is set so as to accept "push" from the server machine 4, the process goes to step S6.

In step S6, the communication control section 13 goes into a wait calling status since the domestic client terminal device 2 is set so as to accept "push" from the server machine 4, and the process goes to step S7 upon receiving calling from the server machine 4.

In step S7, the server machine 4 accesses individual domestic client terminal devices 2 in a time differential manner according to the schedules assigned for the individual users, and the process goes to step S9. The individual domestic client terminal devices 2 are set so as to accept connection requests from the server machine 4 according to the "downloader", and in step S9, upon establishing the connection, download content data distributed at the time scheduled on the server machine 4 into the HDD 16.

Figure 5:
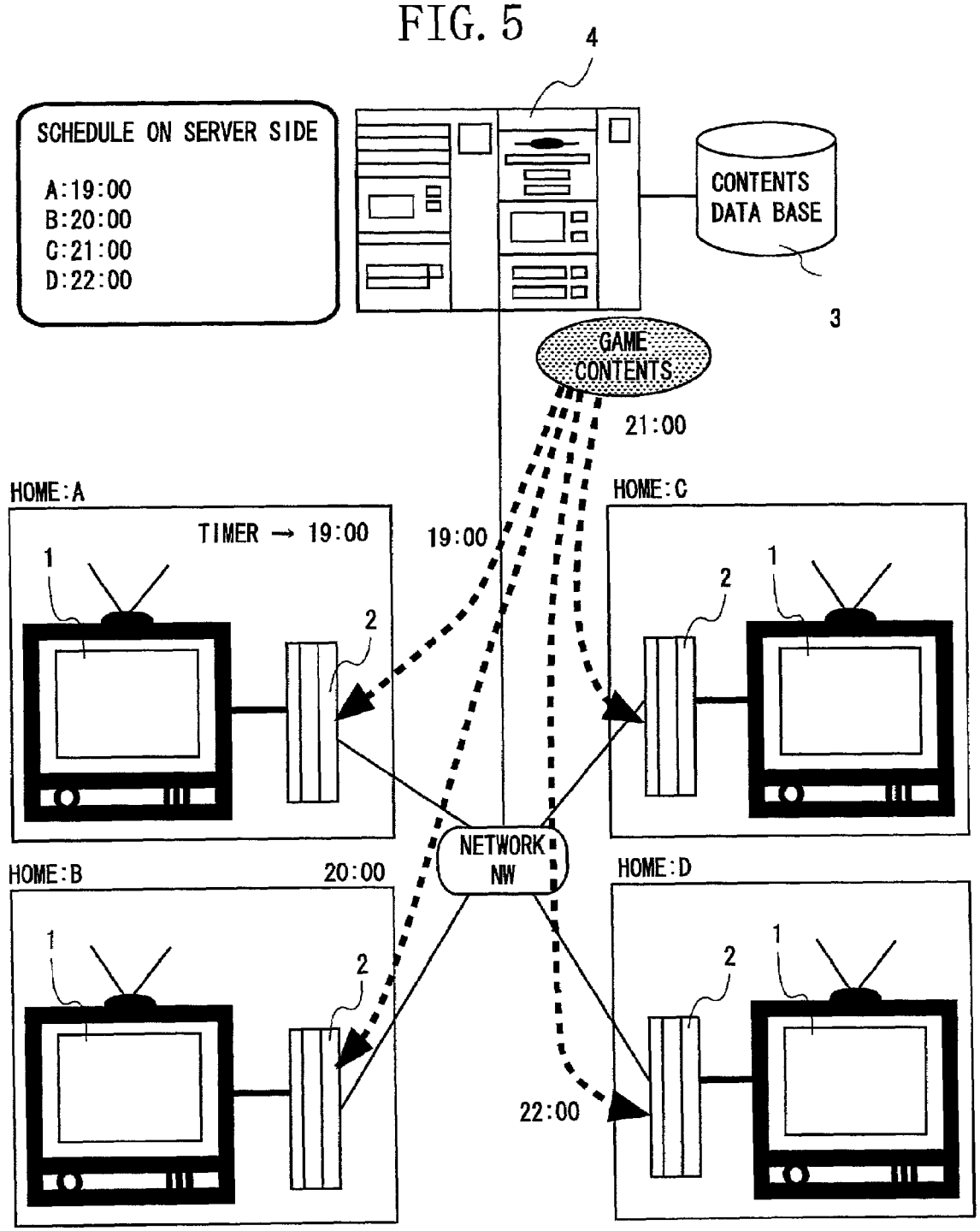
FIG. 5 is a schematic drawing illustrating a process of downloading content data from a server machine via a push-type approach.

FIG. 5 is a schematic drawing showing the content data distribution under the push-type connection. FIG. 5 shows an exemplary case in which a game content data is distributed from the server machine 4, where allowable downloading time is assigned to each of the users' homes A to D, such as for example 19:00 for user's home A, 20:00 for user's home B, 21:00 for user's home C and 22:00 for user's home D.

Thus the server machine 4 accesses the domestic client terminal device 2 at user's home A at 19:00, by which predetermined game content data is downloaded from such server machine 4 to the domestic client terminal device 2 at user's home A.

Similarly, the server machine 4 makes accesses to the individual domestic client terminal devices 2 at users' homes B, C and D at 20:00, 21:00 and 22:00, respectively, by which predetermined game content data are downloaded from such server machine 4 to the individual domestic client terminals 2 at users' homes B, C and D in a time differential manner.

The downloaded content data is supplied, under communication control by the communication control section 13, via the communication card 17 and the communication card slot 15 to the HDD 16, and then stored under control of the control section 9 into a predetermined region (i.e., the writable region in FIG. 7) of the HDD 16 as described below.

While the downloading time is adjusted for every user's home in the above exemplary case, it is also allowable that the downloading time is adjusted for every district.

While in the foregoing described case of downloading under the pull-type connection, it is necessary for the domestic client terminal device 2 to obtain a schedule from the server machine 4 prior to downloading content data, the downloading under such push-type connection does not require the domestic client terminal device 2 to obtain a schedule in advance or manage such schedule, since the schedule management is conducted using the server machine 4 and such server machine 4 accesses a predetermined domestic client terminal device 2 to thereby distribute the content data when the specified time comes.

This also allows the limited traffic capacity of the network to be effectively used. Thus, smooth downloading of desired content data can be assured since the downloading times are assigned for the individual users (or the individual districts) and the content data are distributed in a time differential manner.

Distribution Management for Schedule File and Content Data

In such entertainment system of this embodiment capable of distributing the schedule file and content data in a time differential manner, the server machine 4 is designed to adjust the distribution time depending on the congestion status of the network and the member level of the users.

Figure 6:
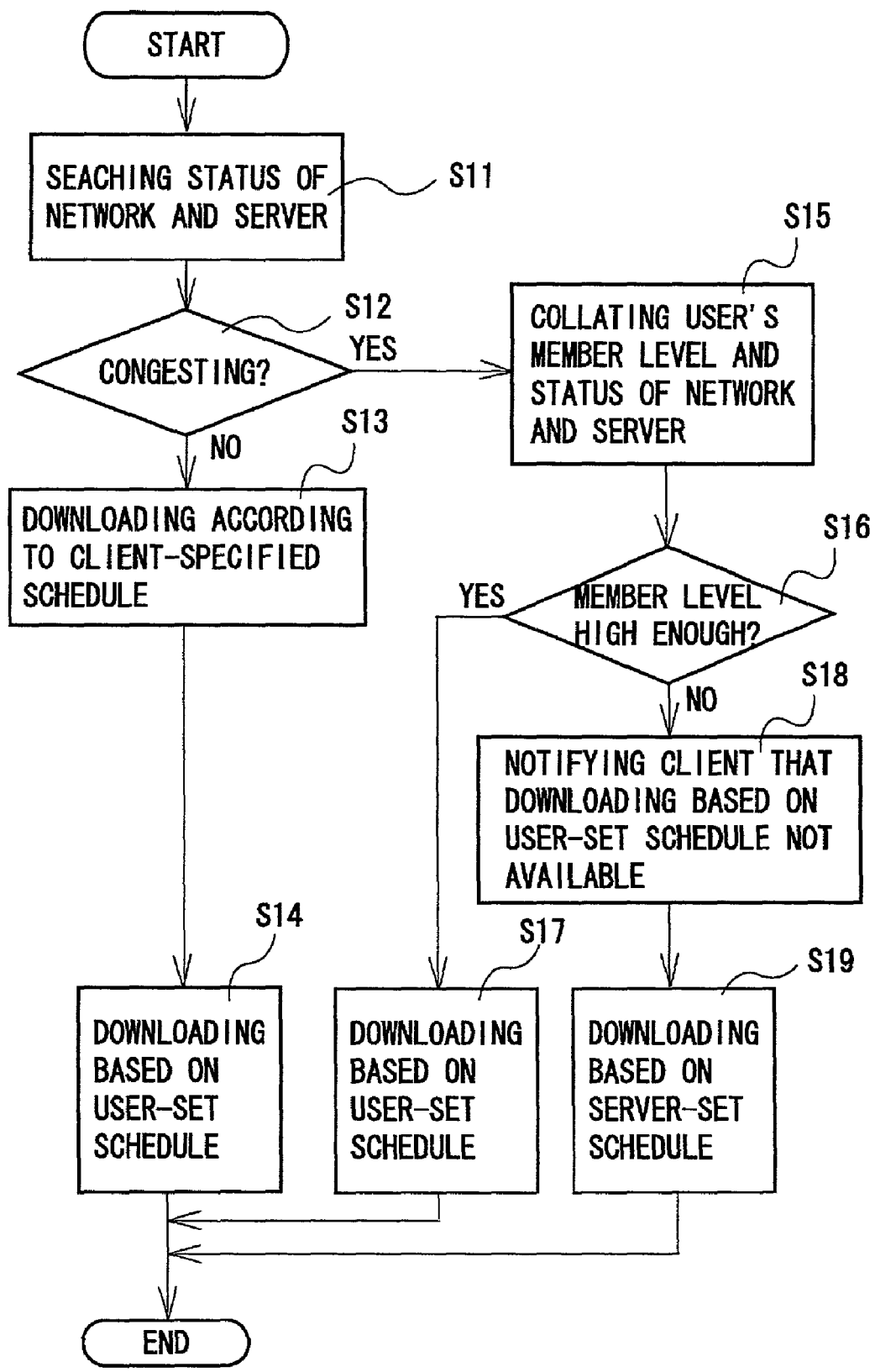
FIG. 6 is a flow chart illustrating a process of downloading content data in the entertainment system in accordance with a congestion status of a network and a member level of a user requesting the content.

A flow chart in FIG. 6 shows a process flow of downloading the schedule file and the content data from the server machine 4 to the domestic client terminal device 2 depending on the congestion status of the network and the member level of the users, in which a flow along step S11→step S12→step S13→step S14 indicates a process flow of downloading when the network capacity is still available.

The process of the flow chart of FIG. 6 starts in the cases described below, which is followed by the process in step S11:

(1) a user-set schedule is determined to be present in step S2 in FIG. 3, and an access is made in step S8 from the domestic client terminal device 2 to the server machine 4 according to the user-set schedule, so that the server machine 4 is ready to distribute the content data in response to such access;

(2) a user-set schedule is determined to be absent in step S2 in FIG. 3, in step S3 the domestic client terminal device 2 is determined to be set to refuse push delivery of content data from the server machine 4, and an access is made in step S4 from the domestic client terminal device 2 to the server machine 4, so that the server machine 4 is ready to distribute a schedule file in response to such access;

(3) a user-set schedule is determined to be absent in step S2 in FIG. 3, in step S3 the domestic client terminal device 2 is determined to be set to refuse push delivery from the server machine 4, and an access is made in step S5 to the server machine 4 according to the schedule file obtained in step S4, so that the server machine 4 is ready to distribute the content data in response to such access; and (4) a user-set schedule is determined to be absent in step S2 in FIG. 3, in step S3 the domestic client terminal device 2 is determined to be set to accept push delivery from the server machine 4, and an access request issued from the server machine 4 is accepted by the domestic client terminal device 2 in steps S6 and S7, so that the server machine 4 is ready to distribute the content data in response to such access.

In step S11, the server machine 4 first searches the current congestion status of the network servers, which is followed by the process in step S12.

In step S12, the server machine 4 determines based on the current congestion status searched in step S11 whether the network is currently congested or not, where the process goes to step S15 when the network is congested (in the case of YES), and goes to step S13 or step S14 when congested (in the case of NO).

Step S13 is performed when the user-set schedule is absent, and the domestic client terminal device 2 accesses the server machine 4 in order to obtain a schedule file, or for the case that a distribution request for predetermined content data is issued from the domestic client terminal device 2 based on the obtained schedule file.

In such step S13, the server machine 4 distributes the schedule file or content data in response to the request from the domestic client terminal device 2, since the network is not currently congested.

Otherwise, step S14 is performed when the user-set schedule is present. In such step S14, the server machine 4 distributes the schedule file or content data according to the user's desired schedule since the network is not currently congested.

On the other hand, when it is determined that the network is congested in step S12, the server machine 4 collates in step S15 the current congestion states of the network and of the server machine 4 itself with the member level of the user who issued the distribution request for the schedule file or content data. The process then continues at step S16.

The member level is determined based on various factors such as the number of accesses by such user (access frequency), communication speed of the communication line, priority of the server machine 4 or the domestic client terminal device 2, and paid charge (whether classified as a special member or a general member depending on the paid charge). The member level is stored in a user management database 7 shown in FIG. 1, and the server machine 4 properly reads out a member level of the relevant user from such user management database 7 to thereby allow the collation in step S15 to proceed.

In step S16, it is determined whether a member level of the user currently issuing the distribution request for the schedule file or content data is high enough based on the collation result in step S15. The process goes to step S17 for the case the member level of the user is high enough (for the case of YES), and goes to step S18 for the case the member level of the user is not high enough or low (for the case of NO).

In step S17, the server machine 4 distributes the schedule file or content data to the user who is given priority over other users irrespective of the current congestion status of the network, since the member level of such user is high enough.

Otherwise in step S18, the server machine 4 notifies the domestic client terminal device 2 of the user that immediate distribution is not possible, since the member level of such user is low. The notice typically appears as "Distribution of the content data is not available due to network congestion. Distribution will start upon relieving the congestion. Sorry for waiting for a while." The notice is followed by the process in step S19. Such notice is displayed on the television image receiver 1 after handling by the domestic client terminal device 2 of the user. Thus, the user who issues the distribution request recognizes the current congestion status of the network.

Even after issuing such notice, the server machine 4 continues to research the congestion status of the network. The distribution of the schedule file or content data is enabled in step S19 according to the schedule specified on the server machine 4 only after the congestion status of the network is relieved so as to match the member level of such user.

As has been described in the above, the entertainment system of this embodiment can regulate distribution of the schedule file or content data depending on the congestion status of the network and the member level of the user. This successfully prevents congestion of the network having limited capacity, and ensures an effective use thereof.

On the other hand, a prompt distribution of the schedule file or content data irrespective of the congestion status of the network is permitted to the users having higher member levels. Such discrimination of the users having higher member levels from the general users in the distribution of the schedule file or content data can ensure satisfaction of such special users having higher member levels.

Such provision of the special service to the users having higher member levels is also advantageous in promoting the use of such system, in that a user may join the system as a special member rather than a general member, or switch from a general member to a special member.

Managing of Downloaded Content Data

The entertainment system of this embodiment manages the downloaded content data with the aid of a novel system constitution as described next.

Division of HDD Region

Figure 7:
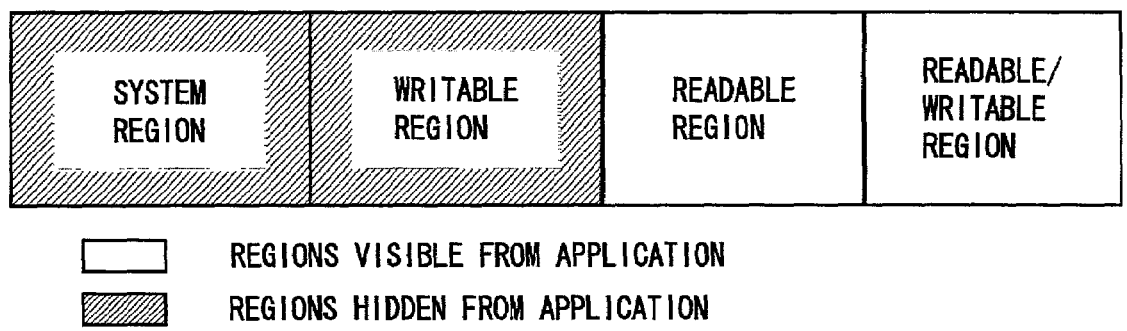
FIG. 7 is a drawing illustrating a recording/reproduction region of a hard disk utilizable by the domestic client terminal device in the entertainment system.

The entire storage region of the HDD 16 of the entertainment system is divided into "system region", "writable region", "readable region" and "readable/writable region" as shown in FIG. 7. Among these, the "system region" and "writable region" hatched in the drawing are not accessible by the user application program and are only accessible by the system programs such as "downloader" and "extractor" of such entertainment system.

On the contrary, the "readable region" and "readable/writable region" are accessible by any of the system programs such as "downloader" and "extractor" and the user application program.

The "system region" stores the system programs such as "downloader" and "extractor", and settings data accessible by the system programs. The system programs stored in the "system region" cannot be accessed by the user application program as described in the above.

The "writable region", which allows read and write access using system application programs, is a data storage area dedicated for such system application programs.

The "readable region" is accessible both by the system application programs and the user application program, where read and write access is permitted through the system programs and only read access is permitted through the user application program.

The "readable/writable region" allows read and write access by both system application programs and user application program, where data written in the region may be completely erased at a timing not selected by the user application program. For example, such data is erased when the domestic client terminal device 2 is re-activated. Thus, the "readable/writable region" can be called a "temporary data region".

Composition of Content Data

The content data distributed from the server machine 4 is previously subjected to encryption and compression, to thereby have a secured archived style (archived content data). Examples of content data distributable in an archived style include an application program for a game, additional data or patch data for a game, shareware (trial program), interactive commercial program, and moving picture data for news, a movie, or a commercial.

Figure 8:
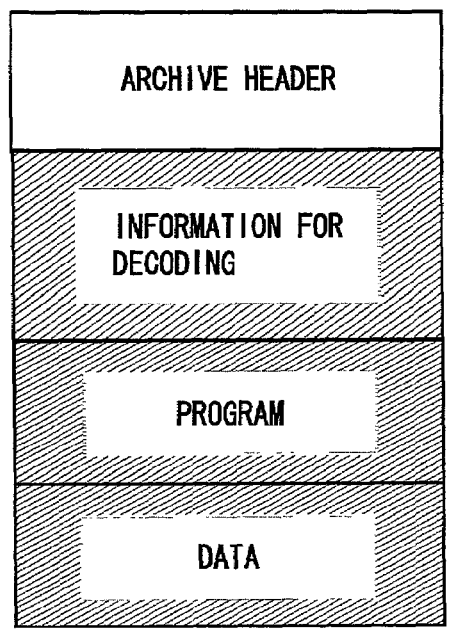
FIG. 8 is a drawing illustrating a data constitution of archived content data downloaded into the domestic client terminal device.

FIG. 8 is a schematic drawing showing a constitution of such archived content data. As is clear from FIG. 8, the archived content data comprises "an archive header", "information for decoding", "a program" and "data".

Among these, information for the "archive header" is not encrypted nor compressed, and is reproducible without decoding or expansion. The "archive header" contains information indicating the identification of the archived content data, such that indicating that the content data is that of a commercial, a movie or the like.

As is described in the above, information of the "archive header" is not encrypted nor compressed, and is reproducible without decoding or expansion, so that when the content data is downloaded into the HDD 16, only the "archive header" is reproduced and displayed for the user. The user then inspects the archive header and selects content data while considering whether the archived content data is necessary or not. If the user considers certain archived content data as necessary and completes predetermined procedures such as paying the charge therefor, the user will be given with a public key from the system administrator. The "information for decoding", "program" and "data" become reproducible with such public key, and the "program" and "data" are expanded and reproduced based on the "information for decoding" (together with the "archive header").

Decoding of Archived Content Data

FIGS. 9A to 9E are schematic drawings showing the decoding of such archived content data.

For the case of such entertainment system, archived content data is first downloaded from the server machine 4 into the HDD unit 6, and the "downloader" writes the downloaded archived content data into the "writable region" of the HDD 16, as shown in FIG. 9A.

Since the archived content data written in the "writable region" is not accessible by the user application program as described in the above, the user cannot use such downloaded archived content data at this point of time.

The "archive header" in the archived content data is, however, not encrypted nor compressed, so that it is reproducible by the user application program and can be displayed on the television image receiver 1. Thus the user can recognize only an outline of the archived content data downloaded into the user's own domestic client terminal device 2.

Next, the user selects the archived content data based on the outline thereof. If the user determines the archived content data as unnecessary and specifies deletion of such content data through operation of the controller 14, the system program will delete the archived content data written in the "writable region" of the HDD 16.

On the other hand, if the user determines the archived content data as necessary and completes predetermined procedures such as paying the charge therefor, the user will receive a public key from the system administrator, for example, under sealed cover through a postal service or through transmission from the server machine 4 to the domestic client terminal device 2.

When the public key is received through a postal service, the user operates the controller 14 to enter the public key. Upon entering the public key, the "extractor" activates. Or, the "extractor" activates when the public key sent from the server machine 4 is received by the domestic client terminal device 2.

The "extractor" conducts decoding correlative to the encryption given to the "information for decoding", "program" and "data" of the archived content data based on the public key, then expands and reproduces the "program" and "data" based on the decoded "information for decoding" (together with "archive header"), to thereby decode the "program" and "data", as "application", into the "writable region" of the HDD 16 as shown in FIG. 9B. The archived content data in the "writable region" is deleted after the decoding as shown in FIG. 9C.

Upon completion of the decoding of "application" into the "writable region", the user application program then activates, by which the application decoded into the "writable region" is reproduced. Data generated by the user application program during such reproduction are written in the "readable/writable region" of the HDD 16 in a form of a "temporary data file" as shown in FIG. 9D.

The "temporary data file" written in the "readable/writable region" is completely deleted later as shown in FIG. 9E, at a timing not selected by the user application program. For example, such file is erased when the domestic client terminal device 2 is re-activated.

As has been described in the above, the entertainment system of this embodiment can distribute the content data from the server machine 4 to the domestic client terminal device 2 in a predetermined form of "secured archived content data", which is advantageous in that it prevents untrustworthy content data, possibly infected with a virus, from being written to the HDD 16.

The entertainment system of this embodiment is designed so that content data are automatically downloaded into the HDD 16 irrespective of whether they are to be purchased or not, and only those for which the user completes the purchasing procedure are decoded to become available. This is advantageous in that the user can decode and use the content data immediately after the completion of the purchasing procedure without having to request the content data to be downloaded.

Since the content data are already downloaded into the HDD 16, it is not necessary for the user to conduct complicated operations such as accessing the server machine in order to purchase the content data, and the user can install the content data without intentionally downloading such content, in a manner equivalent to the foregoing described decoding.

Since the content data are downloaded into the "writable region" to which the user application program read and write access, the content data cannot be decoded nor used unless otherwise the user completes the purchasing procedure and is given a public key from a system administrator. This successfully prevents unauthorized use (enjoyment) of the content data.

Among the content data downloaded into the HDD 16, those not purchased are specified by the user through operating the controller 14 and deleted from the "writable region", so that undesirable accumulation of the unnecessary content data in the "writable region" of the HDD 16 is avoided.

Such entertainment system, makes it possible, for example, for content data to be downloaded into the user's domestic client terminal device 2 without the user aware of it, such as during sleeping. Desired content data can be decoded and becomes available without the user needing to request access thereto from the server machine 4. Thus the entertainment system impresses the user as a quite surprising, convenient and absolutely novel one.

Message Digest Function Value

Figure 10:
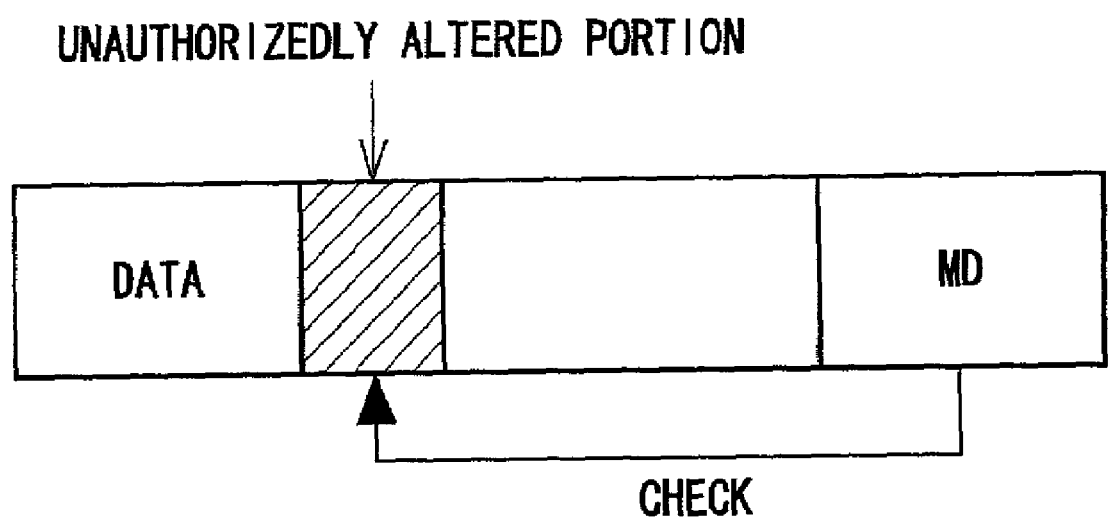
FIG. 10 is a drawing illustrating a message digest function value (MD) added to the archived content data or a system program.

As has been described referring to FIG. 8, the archived content data contains the "archive header", "information for decoding", "program" and "data", among which the "data" is added with a message digest function value (MD) as shown in FIG. 10. Such message digest function value is also added individually to the system programs such as "downloader" and "extractor".

When the application of the downloaded archived content data is decoded into the "readable region" of the HDD 16, the "downloader" checks data string of the application using the message digest function value in a periodic or non-periodic manner. If an unauthorizedly altered portion as shown in FIG. 10 is detected, a message such as "The application has a sign of unauthorized alteration" is displayed for the user, and the application remains unavailable until the unauthorizedly altered portion is corrected.

The system programs such as "downloader" and "extractor" check their data strings using the message digest function values added thereto in a periodic or non-periodic manner. If an unauthorizedly altered portion is detected, a message such as "The system program has detected unauthorized alteration" is displayed using such system programs for the user. Various operations using such system programs, such as the downloading and decoding of the archived content data, are terminated until the unauthorizedly altered portion is corrected.

This successfully prevents unauthorized use of various archived content data with the aid of an unauthorizedly altered program in the HDD 16. It is now also allowable to add a check-sum in place of the message digest function value, which will result in the same effect.

Collation of Message Digest Function Value and Public Key

The entertainment system, thus, can detect unauthorized alteration of the system programs or user application program using the message digest function value. However, unauthorized alteration in the system programs, for example, cannot be detected if the message digest function value per se is unauthorizedly altered.

The encrypted archived content data is decoded using the public key provided from the system administrator and is decoded from the "writable region" into the "readable region" in the HDD 16. If the public key per se is altered without authorization, unlimited unauthorized use could be made of the archived content that is downloaded into the "writable region".

To overcome such problems, the server machine 4 of the entertainment system is provided with an MD/public key database 8 for storing master data for the individual message digest function values (MDs) and the public key for the individual archived content data. The domestic client terminal device 2 makes connection with the server machine 4 in a periodic or non-periodic manner based on the system programs, and collates the message digest function value and the public key currently used with the master data of those stored in the MD/public key database 8.

When a disagreement is detected between the message digest function value or the public key currently used and the corresponding master data, the application is disabled or the system operation of the device is terminated on the assumption that the message digest function value or the public key is unauthorizedly altered. This successfully prevents the unauthorized use of the archived content data downloaded into the "writable region" of the HDD 16 with the aid of the unauthorizedly altered message digest function value or the public key.

Installation from Physical Medium

While in the above description of the embodiment the archived content data is downloaded by connecting the domestic client terminal device 2 to the server machine 4 via the network NW, it is also allowable to install the content data from the physical medium 10 such as a CD-ROM or DVD-ROM.

The physical medium 10 in the above exemplary case contains a complete program as the archived content data, where it is also permitted to store only a part of the program. The physical medium 10 is distributed to the user free of charge or at low prices.

The domestic client terminal device 2 is provided with the disk driver 11 as shown in FIG. 1. The disk driver 11 reproduces the individual archived content data recorded in such physical medium 10 upon being loaded with the physical medium 10. Based on the downloader, the control section 9 writes the reproduced archived content data into the "writable region" as shown in FIG. 7, preventing the user application program from intervening. This enables the individual archived content data to be installed into the HDD 16 without connecting the domestic client terminal device 2 to the server machine 4.

For the case that the physical medium contains only a part of the program, the user who wants to purchase the complete program has to visit a shop to purchase, or to ask the system administrator to send it by post. Alternatively, the physical medium 10 distributed for such entertainment system originally contains the complete program. In such case, the user can immediately use the program without visiting the shop to purchase, once the user is provided with the public key from the system administrator.

The same will apply to the case that a part of the program is distributed through the network. The user who receives a part of the program through the network has to make an access to a predetermined server machine to download the complete program when the user wants to purchase the program. Alternatively, the archived content data distributed for such entertainment system is originally archived and distributed as a complete program. In such case, the user can immediately use the complete program without having to engage in a complicated procedure such as accessing a predetermined server machine again, whenever the user is provided with the public key from the system administrator.

For the case that a patch will be provided or data will be added to the content data program already installed in the domestic client terminal device 2, such patch data or additional data may be distributed to the user in a form of being stored in the physical medium 10. It is also allowable to distribute such patch data or additional data from the server machine 4.

Updating of System Programs etc.

The "downloader" and "extractor", which are system programs stored in the HDD 16 of the domestic client terminal device 2, and public key are designed to be updated in a periodic or non-periodic manner.

The updating is accomplished by updated information distributed to the user in a form of being stored in the physical medium 10 and reproduced by such user, or downloaded from the server machine 4 as one event of the downloading schedule.

The physical medium 10 storing the updated information may be such as to contain only the updated information to be distributed to the user, or may be a game disk added with the updated information added thereto.

When the physical medium 10 storing the updated information is reproduced, the domestic client terminal device 2 compares a version of the system programs currently stored in the HDD 16 and a version of the updated information reproduced from the physical medium 10. If the version of the updated information reproduced from the physical medium 10 is found to be newer than that of the "downloader", "extractor" system programs or public keys currently stored in the HDD 16, such updated information reproduced from the physical medium 10 is written over the old "downloader", "extractor" stored in the HDD 16 or over the public keys. This successfully updates the system programs or public keys through off-line procedures.

In such entertainment system, the user can include periodic or non-periodic downloading of the updated information in the downloading schedule. In the entertainment system, downloading of various content data proceeds according to the schedule defined by the user or the server machine 4, where the updated information can be distributed as a portion of such downloaded content data.

When the updated information is downloaded, the domestic client terminal device 2 compares a version of the system programs currently stored in the HDD 16 with a version of the updated information that is downloaded. If the version of the updated information is found to be newer than that of the system programs currently stored in the HDD 16, the domestic client terminal device 2 writes the updated information over the old "downloader", "extractor" stored in the HDD 16 or over the public keys. This successfully updates the system programs or public keys without the user needing to be aware of it.

Style of Use of Entertainment System

Last of all, use of such entertainment system will be explained based on a specific example.

Distribution of Game Content Data

Assume now that a role playing game (RPG) is launched from the system administrator. This RPG is very popular, for which purchase by a vast number of users is expected. Thus the server machine 4 distributes the archived content data of the RPG to the domestic client terminal devices 2 of the individual users based on a schedule specified by the user or set on the server machine 4 irrespective of intention of the purchase.

The server machine 4 now distributes the archived content data depending on the congestion status of the network or the priority such as member level of the individual users, as previously explained referring to the flow chart in FIG. 6. When a plurality of users have a same priority, an expedient priority is generated using, for example, random numbers, and based on which the archived content data of the RPG is distributed in a time differential manner.

More specifically, assume that one user has specified the active downloading of the RPG through operating the domestic client terminal device 2. The "downloader" of the domestic client terminal device 2 communicates, as instructed by the user, with the server machine 4 to thereby request downloading of the RPG. Upon receiving the request, the server machine 4 determines how much traffic is on the network. If the server machine 4 determines that the network is congested, the RPG is distributed at dawn when the network congestion will be relieved, not immediately. This ensures the distribution of the RPG based on an effective use of the limited capacity of the network.

Now a user having a high member level benefit by an immediate downloading as described in the above.

The archived content data of the RPG distributed to the domestic client terminal devices 2 of the individual users is written into the "writable region" of the HDD 16, which can be accessed only by the system programs (FIG. 9A). The archived content data is decoded into the "readable region" of the HDD 16 only by using the public key provided by the system administrator upon completion of the purchasing procedures by the user.

When the launching of a very popular game is announced, it is often seen that a lot of fans form a long queue at the storefront on the day of launching, and some of them even spend several nights at the storefront before the day of launching. On the other hand, the entertainment system distributes the game content data to the domestic client terminal devices 2 of the individual users irrespective of the intention of the purchase, and the decoding and use of the game are only permitted for those completing the purchasing procedures. Thus, the users can enjoy the popular game without waiting in the queue at the storefront.

This is also beneficial for the system administrator since it is not necessary to use a physical medium such as CD-ROM or DVD-ROM in order to distribute the content data, which significantly saves cost for the content data distribution.

Distribution of Various Content Data

The content data distributed from the server machine 4 in the entertainment system are by no means limited to game content data. That is, the server machine 4 of this entertainment system is to distribute content data to the domestic client terminal devices 2, the content data containing, for example, news, commercials for announcing a sport event or concert, a new movie and commercial content data for a daily new game (or at regular intervals).

Upon completion of the purchasing procedures by each user, the server machine 4 analyzes the user's taste based on the purchased content data and accumulates the processed data in a statistical database 25 shown in FIG. 1.

The server machine 4 also issues a questionnaire when the user joins this system or in a periodic (or non-periodic) manner for determining the taste of the user, analyzes the user's taste based on the answers to the questionnaire and accumulates the processed data in a statistical database 25 shown in FIG. 1.

The content data to be distributed can also be specified by the user, and the server machine 4 accumulates information for indicating an identification of the content data specified by the user into the statistical database 25 shown in FIG. 1.

Thus the server machine 4 refers to the statistical database 25 for every distribution of the content data to the user, to thereby ensure distribution of content data is well matched to the user's taste.

Figure 11:
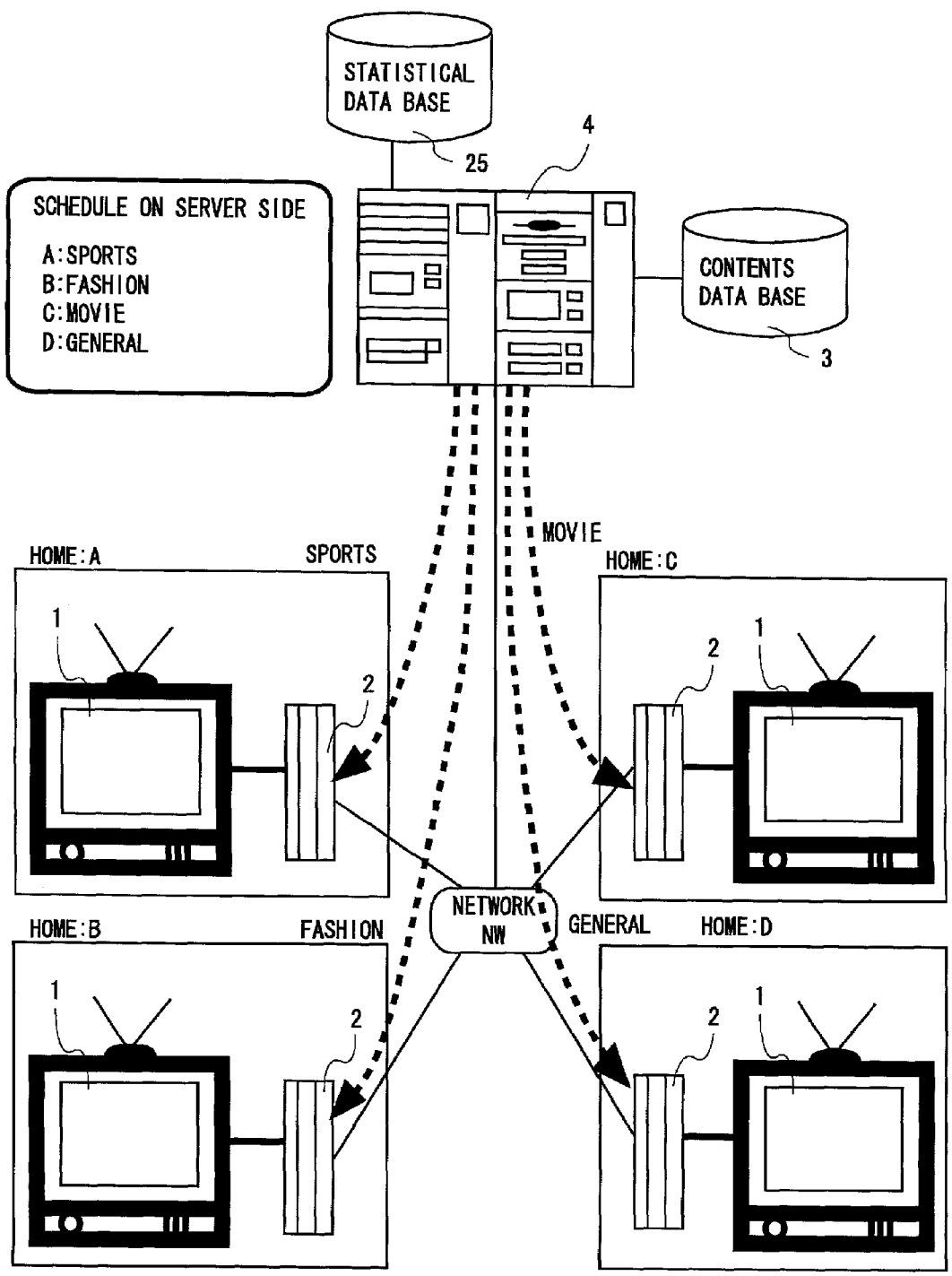
FIG. 11 is a drawing illustrating content data distribution in the entertainment system based on the users' taste.

FIG. 11 is a schematic diagram showing content data distribution based on the users' taste accumulated in such statistical database 25.

In FIG. 11, when the user at the user's home A completed purchasing procedures for several kinds of sport games, such purchasing history is accumulated in the statistical database 25. The server machine 4 refers to the statistical database 25 when it distributes the content data to the user. Since the purchasing history of the user indicates that the user is fond of sports, the server machine 4 distributes content data arranged to contain mainly sport-related matters.

Similarly, when a questionnaire is issued to the user at the user's home B and the user answers as being interested in fashion, such taste of the user at the user's home B is accumulated in the statistical database 25. The server machine 4 thus refers to the statistical database 25 and then distributes content data arranged to contain mainly fashion-related matters to the user at the user's home B.

Similarly, when the user at the user's home C requests the distribution of movie-related content data, information indicating an identification of content data requested by the user is accumulated in the statistical database 25. The server machine 4 thus refers to the statistical database 25 and then distributes content data arranged to contain mainly movie-related matters to the user at the user's home C.

For the case that the user at the user's home D has no special request for content data, information corresponding to such user in the statistical database 25 remains blank or equivalent, so that the server machine 4 distributes content data covering general information on sports, movie, news and the like to the user at the user's home D.

This ensures the content data distribution is well matched to the users' tastes. From the users' points of view, only the content data in their own tastes or needs are downloaded.

While all of such content data may bear a charge, some content data may more preferably be free of charge. In this entertainment system, content data for all of news, commercials announcing a sport event or concert, a new movie and commercials for a new game are free of charge. Decoding of such content data does not need the public key, and the "extractor" properly decodes such content data without using the public key to thereby allow the users to enjoy the content data.

It is supposed that today's life style of users includes waking up in the morning, turning the television set ON, having breakfast while looking or listening a television programs such as news, and then going out to work. Such television programs are scheduled and edited on the convenience of television stations, and it is thus hard to say that the users truly desire them. Or rather, much of the information provided in the programs is even unnecessary for the users.

By constructing now such entertainment system, content data matched to the user's taste are downloaded daily (or periodically) into the user's domestic client terminal device 2 while the user is sleeping.

With the provision of such entertainment system, the life style of the user includes waking up in the morning, checking the content data downloaded to the user's own domestic client terminal device 2, obtaining desired information at a desired time, and then going out for work.

It can thus be said that such entertainment system is most promising and eagerly awaited, since it offers a new life style to users.

The embodiments described in the above are only part of the examples of the present invention. It is therefore to be understood that the present invention may be practiced with modifications or enhancements that may depend on the design or the like otherwise than as specifically described herein without departing from the scope and the technical spirit thereof.

The invention claimed is:

1. A system for distributing content data, comprising:
a data server; and
a plurality of data terminals, each operable to receive content data from said data server, the content data including at least one of reproducible program content data or executable program content data, each of said plurality of data terminals being operable to perform at least one of reproducing a program including at least one of audio or video from the reproducible program content data, or executing a program using the executable program content data in accordance with input from a user,
wherein said data server is operable to distribute the content data to ones of said plurality of data terminals over an electronic data network in accordance with respective user-set content distribution schedules set by distribution requests of users of said ones of said plurality of data terminals, and is operable to determine whether the electronic data network is congested before distributing the content data, such that when the data server determines that the electronic data network is not congested, the data server distributes the content data to said ones of said plurality of data terminals according to the respective user-set content distribution schedules.

2. The system as claimed in claim 1, wherein each one of said plurality of data terminals is operable to record a timing for receiving the content data prior to receiving the content data when setting the user-set content distribution schedule.

3. The system as claimed in claim 2, wherein each one of said plurality of data terminals is operable to request said data server to distribute the content data in accordance with the timing recorded by that data terminal.

4. The system as claimed in claim 2, wherein said data server is operable to distribute the content data to said plurality of data terminals in accordance with the timings recorded by said plurality of data terminals.

5. The system as claimed in claim 1, wherein said data server further includes a database storing a plurality of priorities assigned to users of said plurality of data terminals, said data server being further operable to access the stored priorities in determining an order of distribution.

6. The system as claimed in claim 5, wherein the plurality of priorities includes a first priority and a second priority and when said data server determines that the electronic data network is congested, said data server is operable to distribute the content data in the order of distribution to a first set of said plurality of data terminals used by users assigned a first priority before said data server distributes the content data to a second set of said plurality of data terminals used by users assigned a second priority.

7. The system as claimed in claim 1, wherein each of said plurality of data terminals is operable to receive selection input from a respective user for selecting a program and to request the user-selected program from said data server, and said data server is operable to distribute the content data corresponding to the user-selected program to said one of said plurality of data terminals which requests the user-selected program according to the user-set content distribution schedule of the respective user.

8. The system as claimed in claim 7, wherein the content data corresponds to a plurality of independent selectable programs, said data server includes a storage unit operable to store the content data, and said data server is operable to select the content data corresponding to the user-selected program from the content data stored in said storage unit and to distribute the selected content data to said one data terminal.

9. The system for distributing content data as claimed in claim 1, wherein said data server includes a database for storing individual information regarding individual levels of users of said plurality of data terminals, such that when the electronic data network is congested said data server is operable to obtain the individual information regarding the individual levels of the users of said plurality of data terminals and to distribute the content data to at least some of the users in accordance with the respective user-set content distribution schedules when the individual levels of the at least some users are high.

10. The system for distributing content data as claimed in claim 9, wherein when the electronic data network is congested, said data server is operable to periodically monitor the individual information regarding the individual levels to determine whether to distribute the content data in accordance with the respective user-set content distribution schedules.

11. The system as claimed in claim 1, wherein each one of said plurality of data terminals is further operable to store the content data received from said data server prior to performing said at least one of reproducing the program or executing the program.

12. The new system for distributing content data as claimed in claim 1, wherein when said data server makes a determination not to distribute the content data to a respective one of said plurality of data terminals in accordance with the respective user-set content distribution schedule, said data server is operable to transmit determination information to the respective data terminal indicating that determination.

* * * * *